No. 631,402. Patented Aug. 22, 1899.
W. H. LEWIS.
ROLL HOLDER TENSION DEVICE.
(Application filed Mar. 18, 1899.)
(No Model.) 2 Sheets—Sheet 1.

Witnesses
Edward C. Rowland.
D. S. Ritterband

Inventor
William H. Lewis
By his Attorney
Phillips Abbott

No. 631,402. Patented Aug. 22, 1899.
W. H. LEWIS.
ROLL HOLDER TENSION DEVICE.
(Application filed Mar. 18, 1899.)

(No Model.) 2 Sheets—Sheet 2.

Witnesses
Edward Rowland.
Edgar A. Mead.

Inventor
William H. Lewis
By his Attorney
Phillips Abbott.

UNITED STATES PATENT OFFICE.

WILLIAM H. LEWIS, OF HUNTINGTON, NEW YORK, ASSIGNOR TO THE E. & H. T. ANTHONY & COMPANY, OF NEW YORK, N. Y.

ROLL-HOLDER TENSION DEVICE.

SPECIFICATION forming part of Letters Patent No. 631,402, dated August 22, 1899.

Application filed March 18, 1899. Serial No. 709,629. (No model.)

*To all whom it may concern:*

Be it known that I, WILLIAM H. LEWIS, a citizen of the United States, and a resident of Huntington, in the county of Suffolk and State of New York, have invented a new and useful improvement in tension devices for cameras in which photographic films or so-called "cartridge-films" are used, it being applicable also to other apparatus in which a similar tension device is useful, of which the following is a specification, reference being had to the accompanying drawings, in which—

Figure 1:
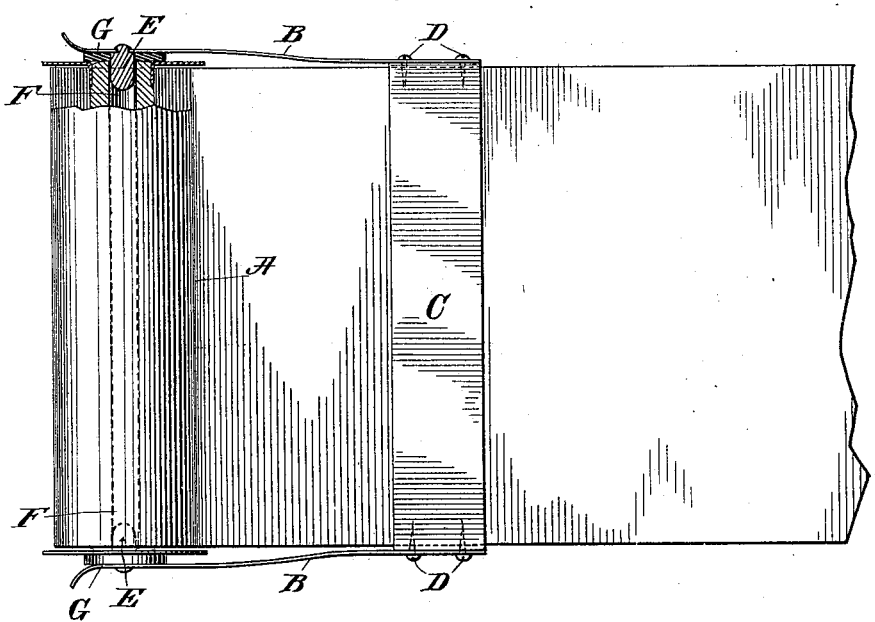
Figure 2:
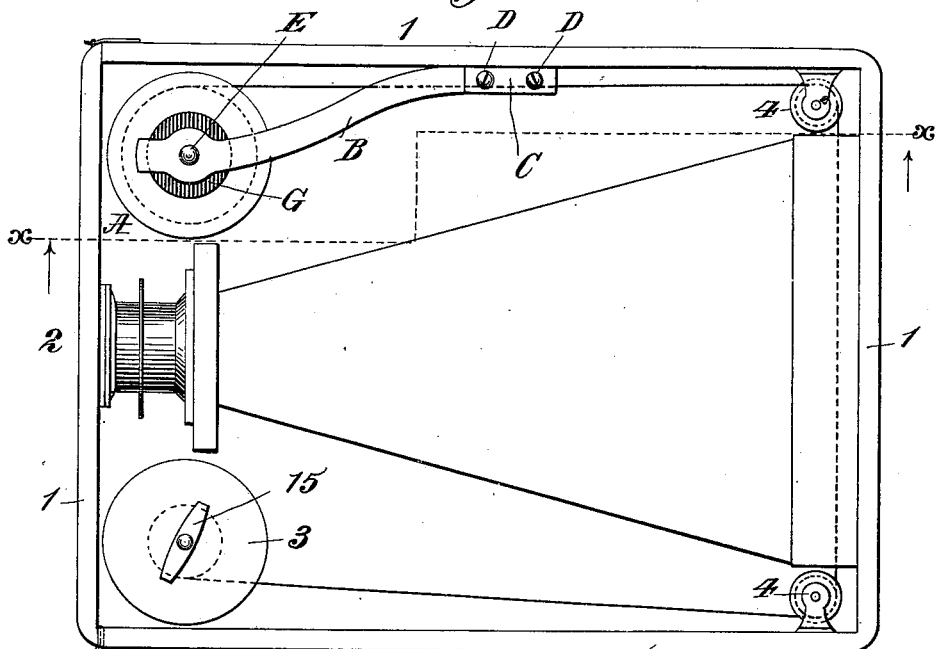
Figure 3:
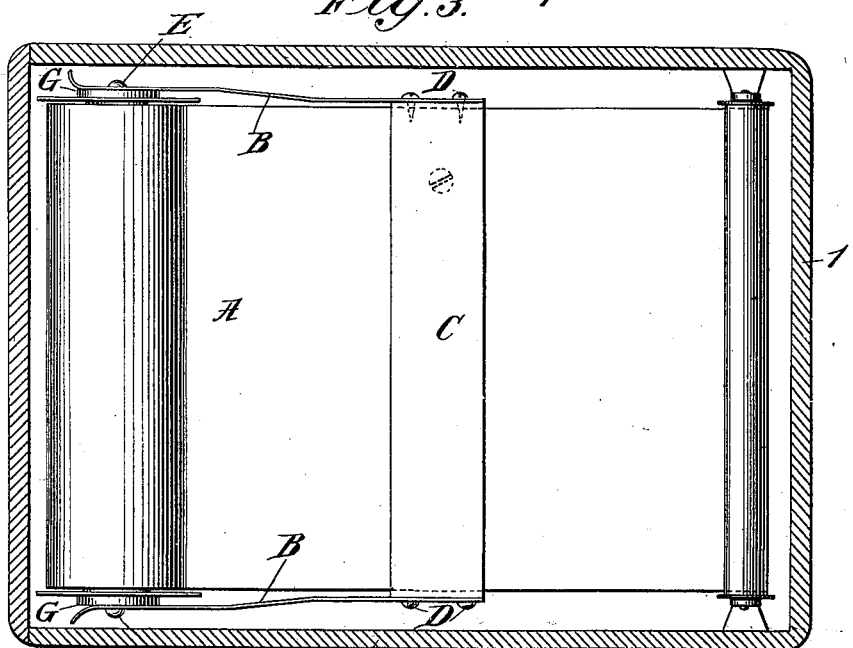

Figure 1 illustrates an elevation of the parts composing the invention detached from the camera. Fig. 2 illustrates a plan view of the invention as embodied within a camera, the top of the camera being removed. Fig. 3 illustrates the parts shown in Fig. 2, seen, however, in elevation, the side of the camera-box being removed.

I wish it to be understood that the special construction illustrated in the drawings need not necessarily be followed; but for convenience of illustration and to aid in the comprehension of the invention I illustrate it in Figs. 2 and 3 as combined with an ordinary camera of the buckeye or bull's-eye construction—that is to say, 1 1, &c., illustrate the sides of an ordinary bull's-eye camera; 2, the lens thereof; 3, the take-up spool; 4 4, the guide-rollers or equivalent devices for properly directing the film; 5, the thumb-nut, ordinarily on the outside of the camera, for turning the take-up spool.

The parts immediately connected with my invention are as follows: A illustrates the spool upon which the film or paper is wound in the first instance, ordinarily called the "supply" spool in cameras of this class. B B illustrate two supports for this spool, made of resilient material, preferably spring metal of some sort.

C represents a suitable support which may be part of the frame of the camera, to which the springs B are attached by screws D D or otherwise, as preferred. In Figs. 2 and 3 of the drawings I show this part C as attached by screws to the side of the camera. Obviously any other suitable part of the structure may be employed as a support for the springs.

E E are trunnions attached to the springs B and which enter recesses F in the respective ends of the spool A.

G G are disks or pads adapted to produce friction. They may beneficially be made of rubber or like material, and they are preferably attached to the springs B, surrounding or adjacent to the trunnions E E.

The operation of the apparatus is as follows: The springs B B are so constructed and arranged that they will normally exert a pressure upon the ends of the spool A, pressing the friction-generating pads G G against it. The spool is inserted by spreading the springs apart, so that the trunnions E E may enter the recesses F F in the ends of the spool, and when the spool is in position, as shown, the springs B B, by pressing the friction-generating disks G G against the ends of it, retard its rotation, and thus the film or other material wound upon the spool is put under tension while being unwound.

It will be obvious to those who are familiar with this art that this invention is applicable to any apparatus or mechanism in which it is desired to exert a retarding or frictional action upon the unwinding of a thread, cord, or web of any material and that it is particularly applicable to photographic apparatus in which a continuous film of sensitized material is used, and it will also be obvious to those who are familiar with this art that certain modifications may be made in the construction of the apparatus without departing from the essentials of the invention.

Having described my invention, I claim—

1. A tension device for roll-holding cameras and similar structures, embodying supports for the spool, one of which is elastic, an axis for the spool engaging with said supports, and a pad of friction-generating material interposed between one of the supports and the end of the spool, for the purposes set forth.

2. A tension device for roll-holding cameras and similar structures, embodying supports for the spool, one of which is elastic, an axis for the spool attached to said supports, and a pad of friction-generating material interposed between one of the supports and one end of the spool, for the purposes set forth.

3. A tension device for roll-holding cameras and similar structures, embodying supports for the spool, one of which is elastic, an axis for the spool engaging with said supports, and a pad of friction-generating material interposed between one of said supports and the end of the spool and permanently attached to said support, for the purposes set forth.

Signed at New York, in the county of New York and State of New York, this 16th day of March, A. D. 1899.

WILLIAM H. LEWIS.

Witnesses:
PHILLIPS ABBOTT,
D. S. RITTERBAND.